(No Model.)
S. W. WRIGHT.
CAR COUPLING.
No. 479,483. Patented July 26, 1892.
Fig. 1.
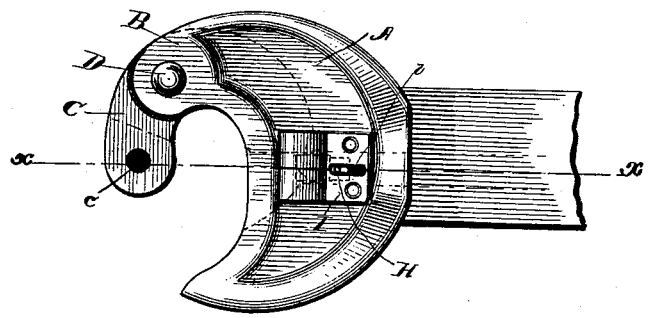
Fig. 2.
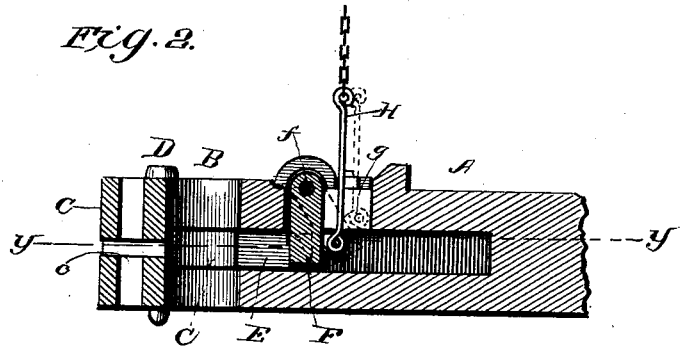
Fig. 3.
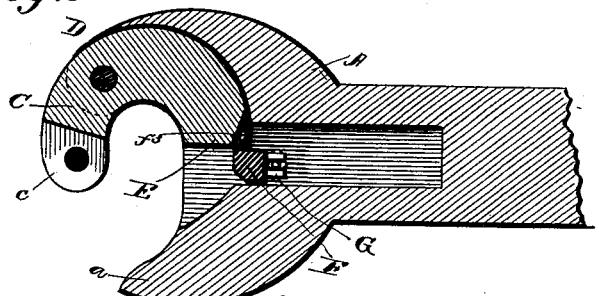
Fig. 4.
WITNESSES:
J. M. Fowler Jr
Edward F. O'Brien
Syrus W. Wright
INVENTOR
BY
ATTORNEY.

UNITED STATES PATENT OFFICE.

SYRUS WASHINGTON WRIGHT, OF EDEN, ALABAMA.

CAR-COUPLING.

SPECIFICATION forming part of Letters Patent No. 479,483, dated July 26, 1892.

Application filed March 3, 1892. Serial No. 423,626. (No model.)

*To all whom it may concern:*

Be it known, that I, SYRUS WASHINGTON WRIGHT, a citizen of the United States of America, residing at Eden, in the county of St. Clair and State of Alabama, have invented certain new and useful Improvements in Car-Couplings, of which the following is a specification, reference being had therein to the accompanying drawings.

This invention relates to certain new and useful improvements in car-couplings, particularly of the class having horizontally-swinging hooks or coupling-heads—such, for instance, as the Dowling or Janney type—the object of the invention being to provide such couplings with a simple and highly-efficient locking mechanism for the coupling-heads, adapted to operate automatically to lock said heads, when they are turned into operative position, by the coming together of two cars or otherwise, and that without having been previously set by the brakeman further than to see that the head or hook is open.

With the above object in view the invention consists, primarily, in providing a weighted pivoted catch in the draw-head, adapted to drop in behind the end of the hook or a shoulder thereon to retain the same in operative position, and, further, the invention consists in certain novel details of construction and combinations and arrangements of parts all as will be now described, and pointed out particularly in the appended claims.

In the accompanying drawings, Figure 1 is a top plan view of a coupling constructed in accordance with my present invention. Fig. 2 is a longitudinal vertical section on the line X X, Fig. 1. Fig. 3 is a horizontal section on the line Y Y, Fig. 2; and Fig. 4 is a detail of the weighted pivoted locking-dog.

Like letters of reference denote the same parts in all the figures.

In the drawings the letter A indicates a draw-head, as shown conforming, approximately, to the lines of the ordinary coupler of the Dowling or Janney type in common use, with the nose $a$ on one side and the recessed projection or arms B on the other side adapted for the reception of the hook or coupling-head C. The hook or coupling-head is preferably of substantially semicircular shape, pivoted in the projection B of the draw-head by the pin D, one end being adapted to interlock with the hook in the opposite head and slotted and perforated, as at $c$, for use in connection with a link and pin in the ordinary manner. The opposite end is squared to form a shoulder E, which when the link is closed passes a short distance beyond the center of the draw-head.

Pivoted on trunnions $f$, working in bearings formed in the top of the draw-head and adapted to move in a slot $g$, is what I shall herein term the "weighted pivoted locking-dog" F. The lower portion of the locking-dog F is adapted to drop in behind the hook when the same is closed and by co-operation with the shoulder E prevent the turning or opening of the hook until the locking-dog is swung up. The said locking-dog is provided on the rear with two ears G, with which a link H co-operates, as shown in Figs. 1 and 4, and works through the slot $g$ in the top of the draw-head to facilitate raising the dog, and besides serving as a most convenient means for the attachment of the link the ears perform the important function of weights, which tend to carry the dog forward into locking position without the necessity of employing springs, &c. The upper end of the locking-dog may be housed in the slot and covered, all save a very small opening $i$ for the passage of the link, by a housing I, bolted or otherwise held in place on the draw-head. The locking-dog is adapted to hang in operative position, save when positively moved and in operation. When the hook is turned from open to close position, as in the act of coupling, its rear end engages the link and forces it back (see dotted lines Fig. 2) until the end of the hook has passed, when the dog drops back to position by reason of its own weight, the hook is locked, and cannot then be released until the dog is raised by extraneous means. To facilitate the movement of the dog, the corner of the dog at $f^2$ and the upper edge of the hook at $f^3$ are slightly beveled or cut away, as will be readily understood.

The simplicity of the device will at once commend it to those skilled in the art, and it will be noted particularly that while it is extremely efficient its strength is not sacrificed, for the locking-dog may be made very heavy, and owing to the short leverage upon it it cannot be bent or broken without the actual destruction of the whole draw-head; but even should it become useless it may be instantly removed from the open bearings in the top of the draw-head by first removing the housing I, the delay and trouble amounting to little more than the insertion of a new pin in the ordinary link-and-pin coupling.

The device is strictly automatic, for the brakeman simply lifts the locking-dog by means of the link to uncouple, and the hook, when opened in the act of uncoupling, stands ready to be again coupled, and the locking-dog needs no attention, for as soon as released it swings back into position to automatically engage the hook when it is closed.

Having thus described my invention, what I claim as new, and desire to secure by Letters Patent, is—

In a car-coupling such as described, the combination, with the draw-head and the hook or coupling-head pivoted therein to swing horizontally, of the weighted locking-dog pivoted in the top of the draw-head and free to hang in the path of the rear end of the hook, the ears on the rear side of the locking-dog, the link connected with said ears and passing out through the top of the draw-head, and the housing for the locking-dog, substantially as described.

In testimony whereof I affix my signature in presence of two witnesses.

SYRUS WASHINGTON WRIGHT.

Witnesses:
    JAMES M. GARRETT,
    ARTHUR L. SPRUIELL.